(12) United States Patent
Mann et al.

(10) Patent No.: US 9,602,382 B2
(45) Date of Patent: Mar. 21, 2017

(54) DYNAMIC REACTION TO DIAMETER ROUTING FAILURES

(75) Inventors: Robert Alexander Mann, Carp (CA); Eric Colaviti, Courcouronnes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 877 days.

(21) Appl. No.: 13/536,517

(22) Filed: Jun. 28, 2012

(65) Prior Publication Data
US 2014/0003225 A1    Jan. 2, 2014

(51) Int. Cl.
*H04L 12/26* (2006.01)
*H04L 12/759* (2013.01)
*H04L 12/24* (2006.01)
*H04L 12/703* (2013.01)

(52) U.S. Cl.
CPC .......... *H04L 43/50* (2013.01); *H04L 41/0654* (2013.01); *H04L 41/0681* (2013.01); *H04L 45/28* (2013.01)

(58) Field of Classification Search
CPC ... H04L 41/0681; H04L 41/654; H04L 53/50; H94L 45/28
USPC ............................ 370/254–350; 709/201–213
See application file for complete search history.

(56) References Cited

U.S. PATENT DOCUMENTS

| | | | |
|---|---|---|---|
| 8,532,110 B2 * | 9/2013 | McCann et al. | 370/392 |
| 8,532,135 B2 * | 9/2013 | Lee et al. | 370/455 |
| 2011/0199895 A1 * | 8/2011 | Kanode | H04L 63/0892 370/225 |
| 2012/0155389 A1 * | 6/2012 | McNamee | H04L 45/306 370/328 |

* cited by examiner

*Primary Examiner* — Ayaz Sheikh
*Assistant Examiner* — Debebe Asefa
(74) *Attorney, Agent, or Firm* — Kramer & Amado, P.C.

(57) ABSTRACT

A method for dynamic reaction to DIAMETER routing failures is disclosed. The method for dynamic reaction to DIAMETER routing failures includes receiving a DIAMETER message, calculating a statistic associated with the route of the message, testing if the message is an unable_to_deliver message type, and if it is, testing the calculated statistic against a criterion. In the event the statistic exceeds the criterion, an action pertinent to the route which had a delivery failure is taken. The method for dynamic reaction to DIAMETER routing failures provides for dynamic management of routes at the node level in response to delivery failures. The method for dynamic reaction to DIAMETER routing failures is particularly useful for overcoming bandwidth usage in terms of delivery failures known in the art.

22 Claims, 5 Drawing Sheets

DYNAMIC REACTION TO DIAMETER ROUTING FAILURES

FIELD OF THE INVENTION

The invention relates to generally to packet rerouting in the event of failures in the network and is particularly concerned with a method of packet rerouting between nodes supporting the DIAMETER protocol.

BACKGROUND OF THE INVENTION

Since its proposal in Internet Engineering Task Force (IETF) Request for Comments (RFC) 3588, the DIAMETER protocol has been increasingly adopted by numerous networked applications. For example, the Third Generation Partnership Project (3GPP) has adopted DIAMETER for various policy and charging control (PCC), mobility management, and IP multimedia subsystem (IMS) applications. As IP-based networks replace circuit-switched networks, DIAMETER is even replacing SS7 as the key communications signaling protocol. As networks evolve, DIAMETER is becoming a widely used protocol among wireless and wireline communications networks.

3GPP Network nodes communicate using DIAMETER commands and to maintain extensibility, typically use a DIAMETER command dictionary to provide the format of commands and Attribute Value Pairs (AVPs One significant aspect of the DIAMETER protocol is DIAMETER packet routing. Entities referred to as DIAMETER routing agents (DRAs) facilitate movement of packets in a network. In various deployments, DRAs may perform elementary functions such as simple routing, proxying, and redirect.

SUMMARY OF THE INVENTION

It is an object of the invention to provide a method of dynamically reacting to DIAMETER routing failures in a DIAMETER network.

In some embodiments the statistic includes the percentage of unable_to_deliver messages in a specified time interval and the criterion is a percentage of unable_to_deliver messages in a specified time interval.

In some embodiments the prespecified action includes the step of removing the original respective route from the routing database of the DRA and in other embodiments the prespecified action includes the step of removing the peer associated with original respective route from the routing database of the DRA.

In some embodiments the prespecified action includes the step of temporarily quarantining for a preset period of time the original respective route from the routing database of the DRA and in some of these embodiments the preset period of time is user configurable.

In alternative embodiments the prespecified action includes the step of temporarily quarantining for a preset period of time the peer associated with original respective route from the routing database of the DRA, and in some of these embodiments the preset period of time is user configurable.

In yet other embodiments the prespecified action includes the step of lowering the priority of the original respective route from the routing database of the DRA and in other embodiments the prespecified action includes the step of lowering the priority of routes through the peer associated with original respective route from the routing database of the DRA.

In some embodiments the prespecified action includes the step of generating a log. In other embodiments the prespecified action includes the step of generating an SNMP trap.

According to another aspect of the invention there is provided a non-transitory machine readable storage medium encoded with instructions for execution by a DIAMETER Routing Agent (DRA) for processing a DIAMETER message associated with an original respective route, the medium having: instructions for receiving a DIAMETER message associated with an original respective route at the DRA; instructions for generating a statistic associated with the type of the DIAMETER message; instructions for testing if the DIAMETER message is an unable_to_deliver message, and if the test is affirmative, then instructions for testing if the statistic exceeds a specified criterion, and if the test is affirmative, then instructions for taking a prespecified action. Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In the following figures, like reference numbers are used to represent like elements.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior.

Figure 1:
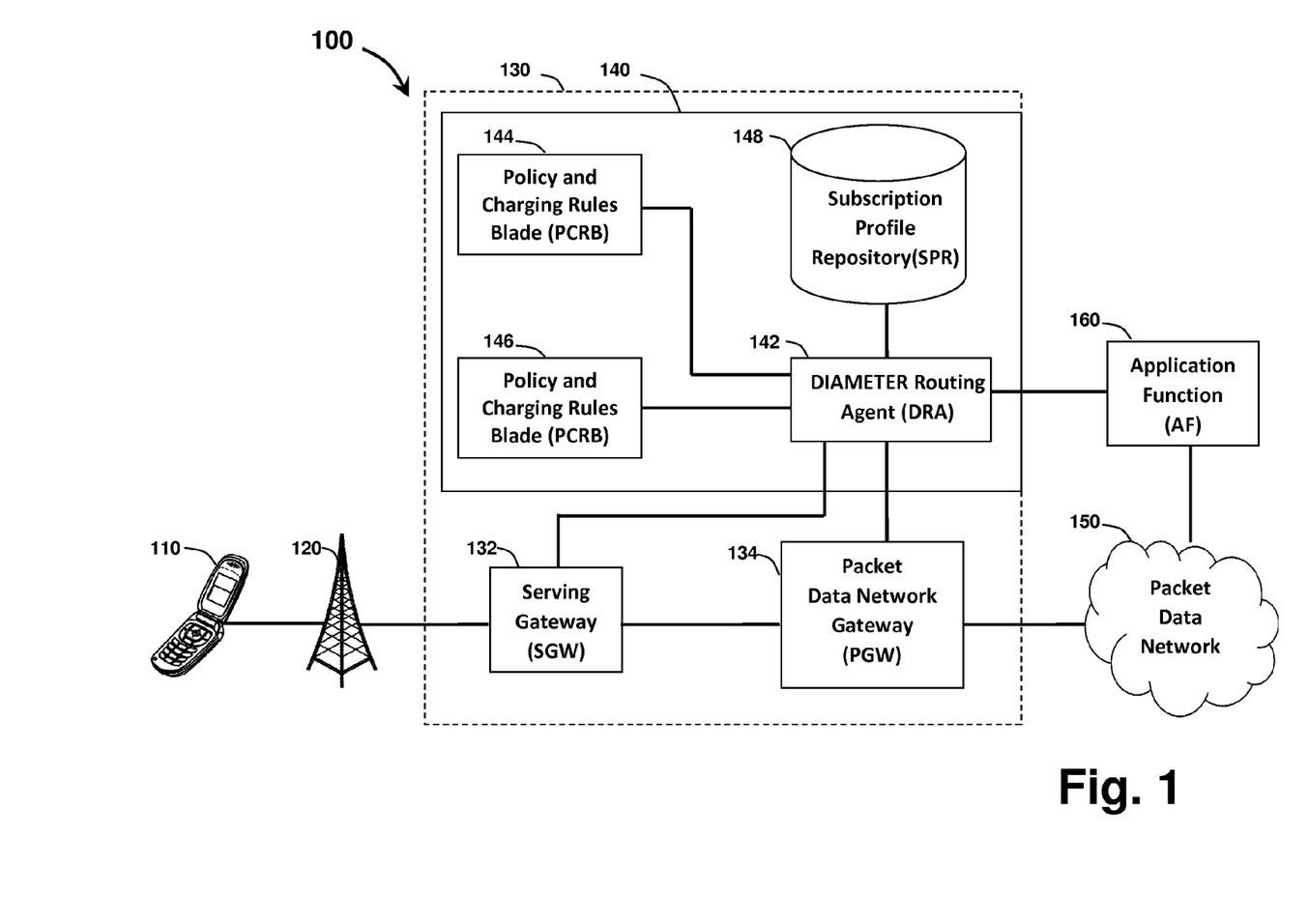
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscription profile repository.

As will be described in greater detail below, DRA 142 may be an intelligent Diameter Routing Agent. As such, DRA 142 may receive, process, and transmit various Diameter messages. DRA 142 may include a number of user-define rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (Path Computational Element Nodes) (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the PMIP standard for example, PCRB 144, 146 may also generate QoS rules. Upon creating a new QoS rule or upon request by the SGW 132, PCRB 144, 146 may provide a QoS rule to SGW 132 via the Gxx interface.

Subscription profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscription information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
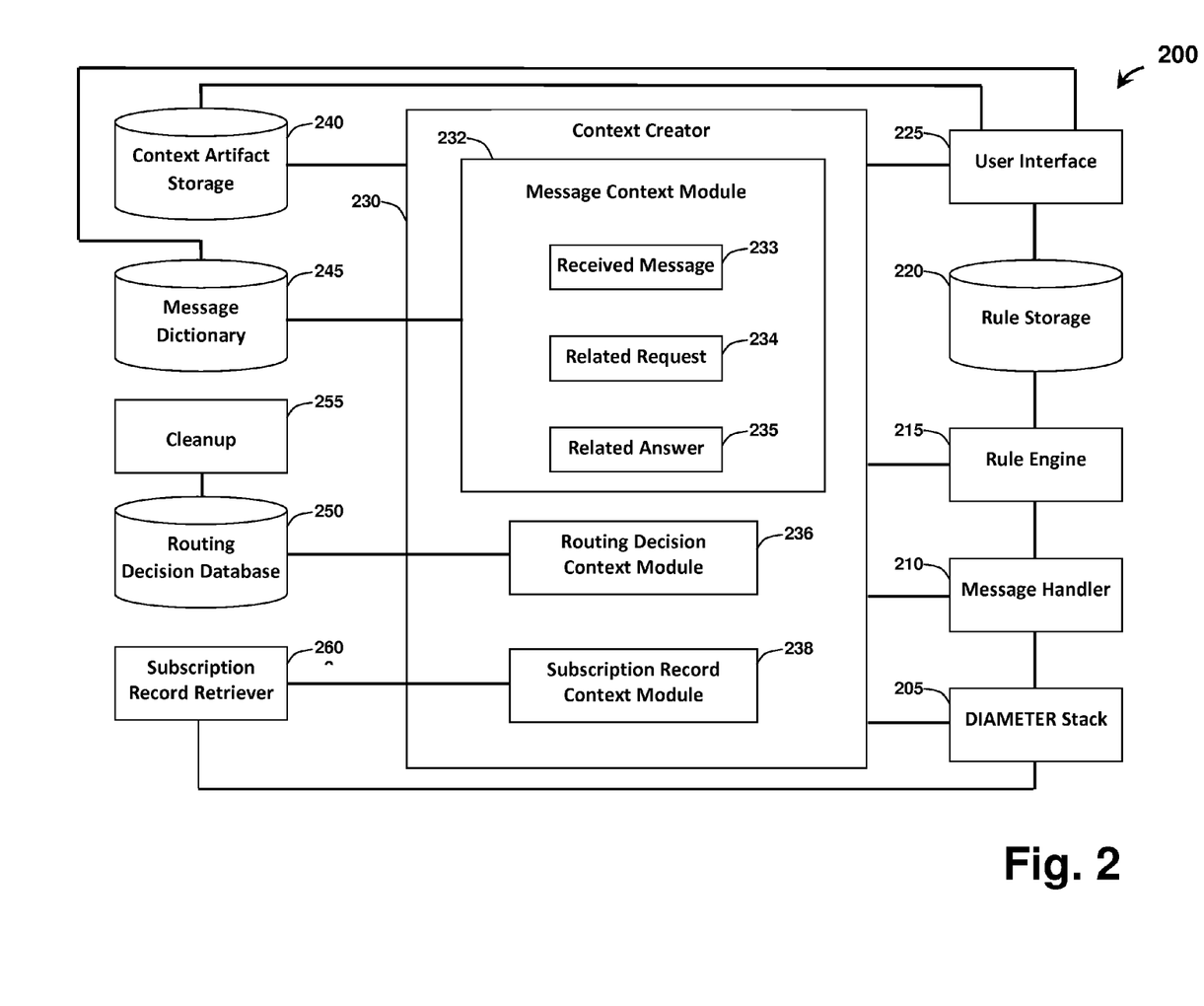
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, routing decision database 250, cleanup module 255, or subscription record retriever 260.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from on the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After evaluating one or more rules, rule engine 215 may pass back an action to be taken or a message to be sent. Message handler 210 may then transmit one or more messages via Diameter stack, as indicated by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structure for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, or a mouse. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscription profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a routing decision context, or a subscription record context. These context artifacts may be used by context creator 230 at run-time to instantiate different types of context objects. As such, context creator 230 may be viewed as including a message context module 232, a routing decision context module 236, and a subscription record context module 238. In various embodiments, a user may be able to define new context artifacts via user interface 225 for storage in context artifact storage.

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an RX RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler may pass the application and command type to the context creator. Message context module 232 may then locate a matching definition in message dictionary. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary. In various embodiments, the user-defined definitions may be stored in a different portion of message dictionary from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting Diameter stack 205 construct the message via the API. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As an example, routing decision context module 236 may be configured to instantiate a routing decision context object. Such routing decision context may identify, for each received Diameter message, a previously made routing decision that may be applicable to the received message. Such previously made routing decisions may be stored in routing decision database 250 along with a session identifier for correlating received messages to previously-processed messages. Routing decision database 250 may be any machine-readable medium capable of storing such routing decisions. Accordingly, routing decision database 250 may include a machine-readable storage medium such as read-only memory (ROM), random-access memory (RAM), magnetic disk storage media, optical storage media, flash-memory devices, and/or similar storage media.

Computational contexts may be supported by other DPA 200 functionality. For example, DPA 200 may include a cleanup module 255 that periodically removes stale entries from routing decision database 250. In some embodiments, the routing decision context object may not interact directly with cleanup module 255. Instead, cleanup module 255 may operate independently, while affecting the behavior of the routing decision context object indirectly by modifying the contents of routing decision database 250.

As another example of a computational context, subscription record context module 238 may generate a subscription record context object. The subscription record context object may utilize other DRA 200 functionality, such as subscription record retriever 260, to retrieve a subscription record for received Diameter messages. Subscription record retriever 260 may include hardware or executable instructions on a machine-readable storage medium configured to communicate with a subscription profile repository (SPR) via Diameter stack 205 to retrieve a subscription record for a Diameter message. Such communication may be performed, for example, according to the Sp application. Various methods of implementing subscription record retriever 260 will be apparent. Through this retrieval of a subscription record, the subscription record context object may provide the rule engine 215 with access to the subscription record It should be noted that while rule storage 220, context artifact storage 240, message dictionary 245, and routing decision database 250 are illustrated as separate devices, one or more of these components may be resident on multiple storage devices. Further, one or more of these components may share a storage device. For example, rule storage, context artifact storage 240, message dictionary 245, and routing decision database 250 may all refer to portions of the same hard disk or flash memory device.

Figure 3A:
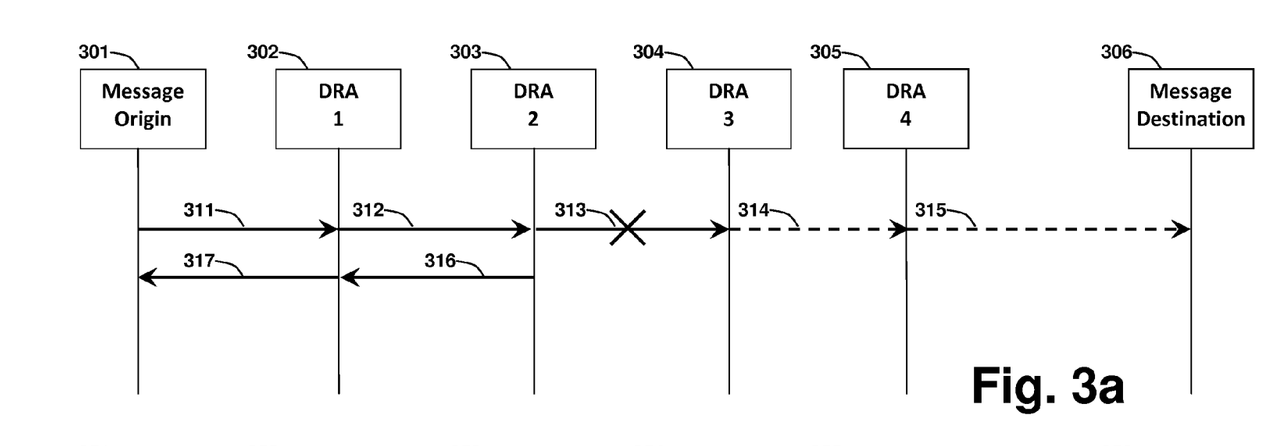
FIG. 3a illustrates a diagram of packets through a DIAMETER network.

FIG. 3 illustrates a diagram of packet forwarding through a DIAMETER network consisting of DIAMETER Routing Agents 1 through 4 at 302, 303, 304, and 305 respectively, message origin node 301, and message destination node 306.

Under normal operating conditions a DIAMETER message from message origin node 301 is sent over successive links 311, 312, 313, 314 and 315 to reach message destination node 306. Consider the event that some network fault, either at node 303 or 304, or between them at link 313 occurs. The DIAMETER message will not reach the message destination node 306 and yield a return Result message. After some time interval, DRA 2 303 will recognize the lack of Result message and send a "DIAMETER_UNABLE_TO_DELIVER" message over link 316 to DRA 1 302. Under some circumstances, link 312 and link 316 may be the same link.

Subsequently, DRA 1 302 will then forward this "DIAMETER_UNABLE_TO_DELIVER" message over link 317 to message origin node 301 indicating that there was a problem delivering the request. Message origin node 301 can then take action in regards to the undelivered request, such as sending the request again or sending the request again on an alternative route. Since a given Request message may travel many links between network nodes to reach its destination, this existing method of returning the unable_to_deliver message to the point of message origin may yield considerable traffic between nodes as the request and response traverse the network multiple times.

Figure 3B:
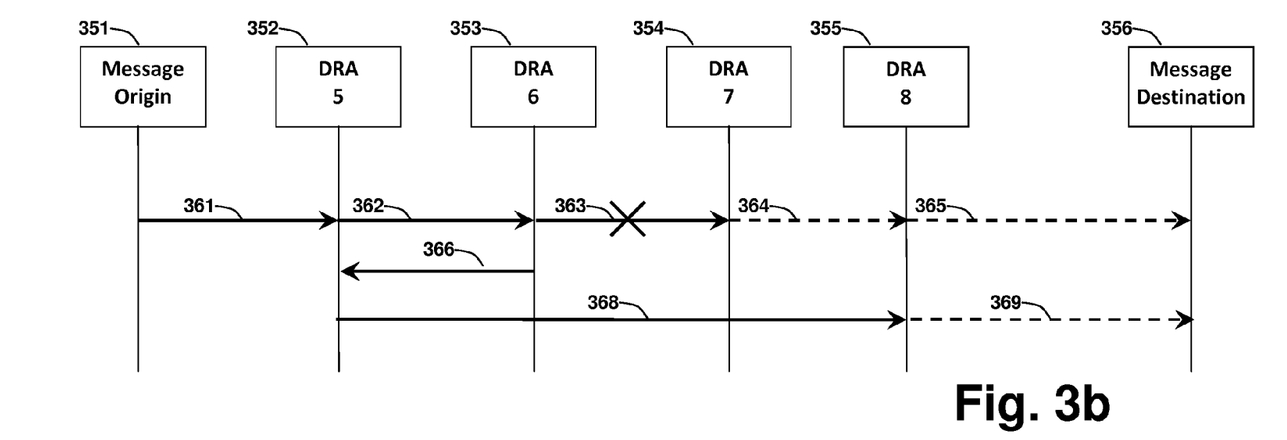
FIG. 3b illustrates a diagram of packets through a DIAMETER network according to an embodiment of the invention.

Referring now to FIG. 3b there may be seen a diagram of packet forwarding through a DIAMETER network according to an embodiment of the invention consisting of DIAMETER Routing Agents 5 through 8 at 352, 353, 354, and 355 respectively, message origin node 351, and message destination node 356.

Under normal operating conditions a DIAMETER message from message origin node 351 is sent over successive links 361, 362, 363, 364 and 365 to reach message destination node 356. Consider the event that some network fault, either at node 353 or 354, or between them at link 363 occurs. The DIAMETER message will not reach the message destination node 356 and yield a return Result message. After some time interval, DRA 6 353 will recognize the lack of Result message and send a "DIAMETER_UNABLE_TO_DELIVER" message over link 366 to DRA 5 352. Again, under some circumstances link 362 and 366 may be the same link.

At this point the DRA 5 352 node may observe the Result code AVP of "DIAMETER_UNABLE_TO_DELIVER" and determine that there is potentially a problem with the route that was used to originally forward the request message. According to embodiments of the invention, the DRA 5 352 may then take a number of actions to address the problem.

With respect to the undelivered request message, DRA 5 352 may resend the request using an alternate route, for example link 368 to DRA 8 355 which connects to message destination node 356 over link 369.

With respect to the problematic route as indicated by the unable_to_deliver message, DRA 5 352 may take any of several actions, including:
  temporarily quarantining the route for a period of time
  temporarily lowering the route priority to a point lower than all other routes for the given application/destination realm indicated by the failed request message;
  remove the specific route from its (DRA 5 352) routing table;
  generate a log about the problem; or
  generate an SNMP trap about the problem.

If the taken action is temporary in nature, the period of time could be optionally configurable via a user interface as in user interface 225 of FIG. 2, or it could be some fixed preset value. At the end of the temporary period, DRA 5 352 could then take optionally take an action which reverses the effect of the original action, restoring the route to its original status.

As part of the evaluation as to whether to take an action, DRA 5 352 could be configured to use a variety of different criteria. A statistical measure of the result messages per route could be maintained, and criterion established with respect to those statistical results. Examples of such criterion include:
  a certain number of sequential requests fail to be delivered;
  a certain number of requests in a given time period fail to be delivered; or
  a certain percentage of requests in a given time period fail to be delivered.

According to one embodiment of the invention, a request is routed by referring to a routing database for an available peer with matching destination-realm and application criteria according to a request message. Several levels of specificity with respect to route quarantining are possible. First and simplest, a particular peer associated with a given route may be quarantined. If a particular peer has a quarantine imposed, all routes using that peer will be unavailable. Alternately, the route associated with a particular destination-realm may be quarantined. As there may be multiple routes through a given peer to different destination-realms, this latter approach offers more resolution. In this approach, should the peer itself be the source of the problem, all routes to that peer will eventually be quarantined.

According to some embodiments of the invention, the choice of routes in the routing table may be given a priority. The priority may be a hierarchical ranking, such that higher ranked routes are used in preference to lower ranking routes. In the event that the DRA takes an action to lower the priority of a route, then that route will only be used if no route is available with a higher priority.

If a temporary quarantine is imposed, the peer associated with the route is considered unavailable for the duration of the quarantine. If the action taken is to remove the route, then the associated entry in the routing table is removed.

According to embodiments of the invention, the DRA may take these actions singly or in combination. The choice of action or plurality of actions may be user configurable or preset.

In operation, there are multiple possible scenarios. Two scenarios are described by way of example, but are not intended to be exclusive. First, in the case that the DRA 6 353 has a timeout interval sufficiently less than the timeout interval of the message origin node 351, then DRA 5 352 may take an action which resends the original request along an alternate route, for example link 368 of FIG. 3b, subsequently receives a response from message destination node 356, and returns it to the message origin node 351 prior to message origin node 351 realizing that there was a delivery failure.

A second scenario is that DRA 5 352 receives the unable_to_deliver message, passes it back to the message origin node 351, and quarantines either the associated route or the associated peer. Subsequently, when the message origin node 351 resends the request, due to the quarantine the request will follow a different route.

Figure 4:
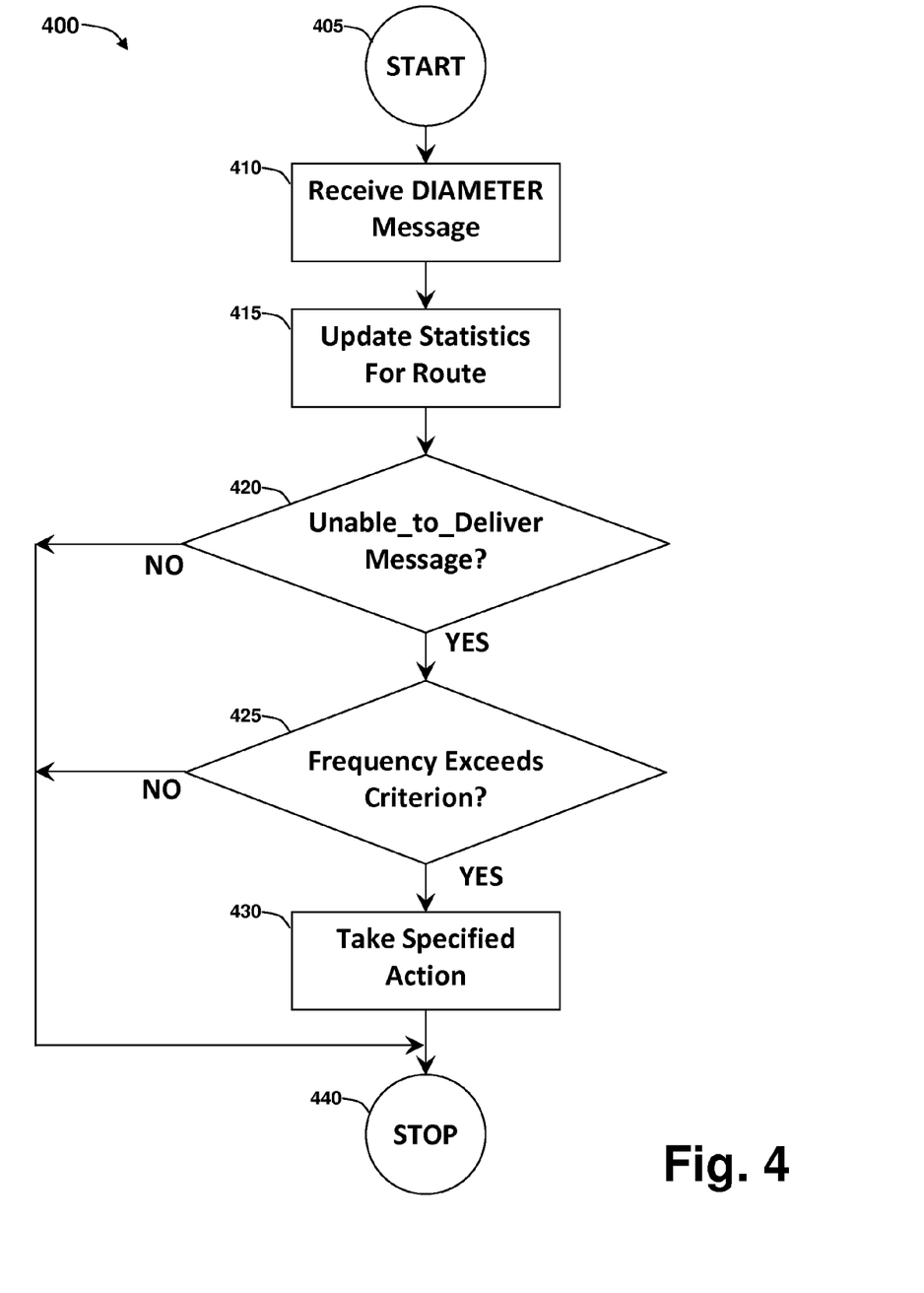
FIG. 4 illustrates a flowchart of a method of handling an unable_to_deliver message according to an embodiment of the invention.

Referring now to FIG. 4 there is illustrated an exemplary method 400 for handling unable_to_deliver messages according to an embodiment of the invention.

Method 400 may start at step 405 and proceed to step 410 whereat a DIAMETER message is received. At step 415 the statistics for the route associated with the received message are updated. These statistics could accumulate the number or percentage of successful messages or the number or percentage of unable_to_deliver messages. The statistics could be relative to a particular stream of messages, for example a last successive quantity of messages, or the statistics could be relative to a period of time.

At step 420 the message is evaluated as to whether it comprises an unable_to_deliver message, such as a "DIAMETER_UNABLE_TO_DELIVER" message. In the event that it is not such a message, the method may proceed to step 440 and stop.

In the event that the evaluation at step 420 affirms that the message is an unable_to_deliver message, control proceeds to step 425 where the method performs the step of evaluating whether the statistic of these unable_to_deliver messages exceeds a criterion. This criterion could be preset or user configurable, and as discussed previously could consist of an excess of unable_to_deliver messages in a particular number of sequential requests, or an excess quantity of unable_to_deliver messages in a given time period, or an excess percentage of unable_to_deliver messages in a given time period.

In the event that the statistic does not exceed the criterion, the method may proceed to step 440 and stop.

In the event that the evaluation at step 425 affirms that the statistic does exceed the criterion, the method proceeds to step 430 whereat it takes a particular action. As previously discussed, the action could comprise any of temporarily quarantining the associated route or peer for a period of time; temporarily lowering the route priority to a point lower than all other routes for the given application/destination realm indicated by the failed request message; removing the specific route from its routing table; generating a log about the problem; or generating an SNMP trap about the problem. Alternatively the action could comprise a combination of these actions.

After taking the specified action, which could be specified as a preset action or series of actions, or as a user configurable action or series of actions, the method may then proceed to step 440 and stop.

Figure 5:
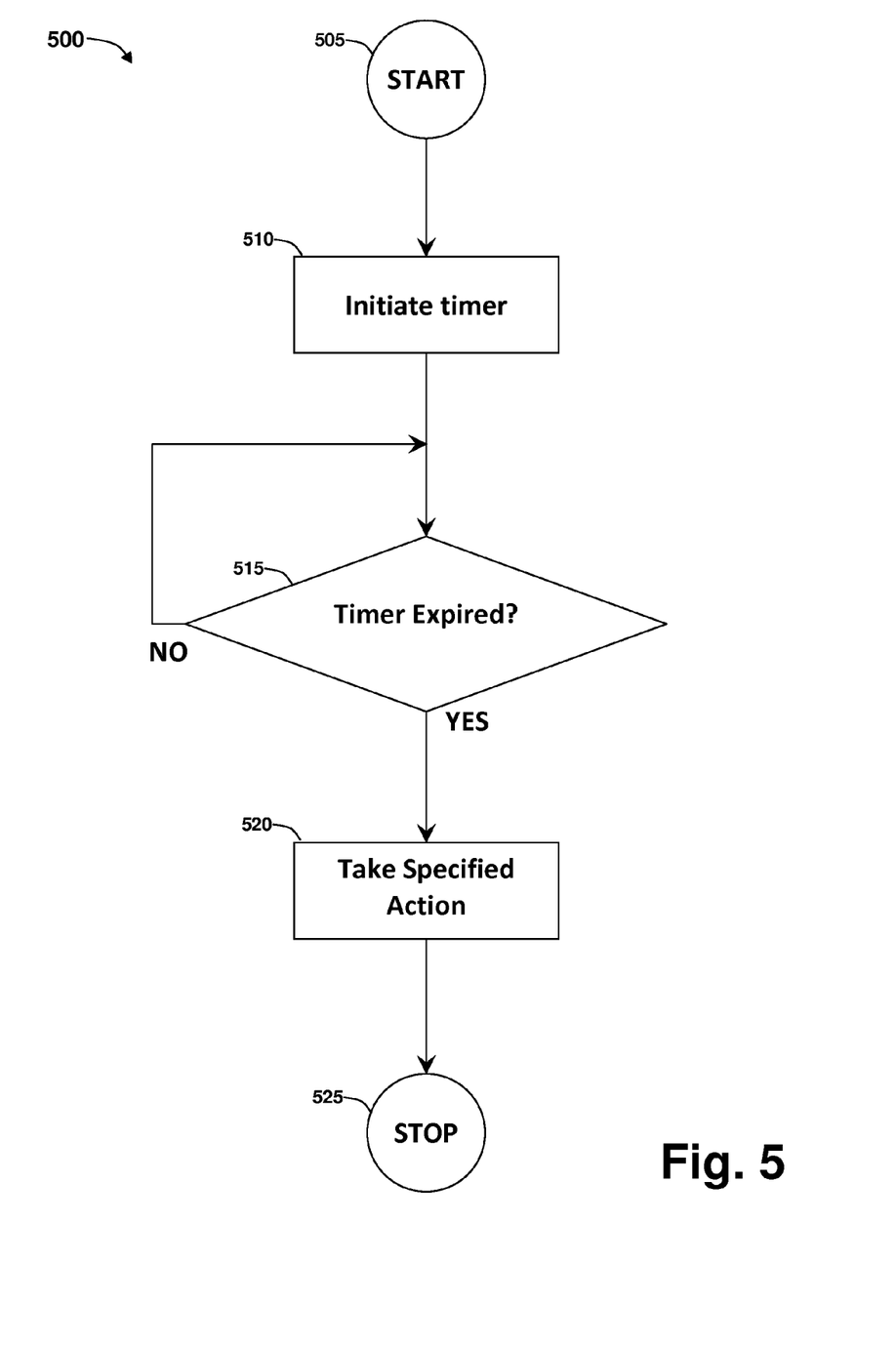
FIG. 5 illustrates a flowchart of a time driven method of restoring a route or peer based according to an embodiment of the invention.

In the event that one of the specified actions is of a temporary nature, method 400 may comprise the additional step, not shown, of taking the action of reversing the temporary action In some embodiments the restoration process is time-driven as opposed to event driven. Referring now to FIG. 5 there is illustrated an exemplary method 500 for handling restoring the priority of a route, or unquarantining a route or peer after a period of time has elapsed according to an embodiment of the invention.

Method 500 may start at step 505 and proceed to step 510 whereat a timer is initialized. Subsequent to the timer being initialized, at step 515 there is a check as to whether the timer has expired. In the event that the answer is in the negative, control stays at step 515. In the event that the answer to the test of step 515 is affirmative, then at step 520 an appropriate restorative action is taken. As previously recited, this action may comprise the restoration of the original priority of the route, or the unquarantining of a route or peer. The method may then proceed to step 525 and stop.

Therefore what has been disclosed is a method and apparatus for handling unable_to_deliver messages in a DIAMETER network which provides DIAMETER Routing Agents the capability to dynamically react to routing problems.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method performed by a DIAMETER Routing Agent (DRA) for processing a DIAMETER message associated with an original respective route, the method comprising:
   receiving said DIAMETER message at the DRA;
   generating a statistic associated with the type of said DIAMETER message;
   testing if said DIAMETER message is an unable_to_deliver message, and if said test is affirmative, then
      testing if said statistic exceeds a specified criterion, and if said test is affirmative, then taking a prespecified action.

2. A method as claimed in claim 1 wherein said statistic is associated to said original respective route associated with said DIAMETER message.

3. A method as claimed in claim 1 wherein said statistic is associated to said peer through which said original respective route traverses.

4. A method as claimed in claim 1 wherein said statistic comprises the number of unable_to_deliver messages in a specified number of sequential messages.

5. A method as claimed in claim 4 wherein said criterion is a quantity of unable_to_deliver messages in a specified number of sequential messages.

6. A method as claimed in claim 1 wherein said statistic comprises the number of unable_to_deliver messages in a specified time interval.

7. A method as claimed in claim 6 wherein said criterion is a quantity of unable_to_deliver messages in a specified time interval.

8. A method as claimed in claim 1 wherein said statistic comprises the percentage of unable_to_deliver messages in a specified time interval.

9. A method as claimed in claim 8 wherein said criterion is a percentage of unable_to_deliver messages in a specified time interval.

10. A method as claimed in claim 1 wherein said prespecified action comprises the step of removing the original respective route from the routing database of said DRA.

11. A method as claimed in claim 1 wherein said prespecified action comprises the step of disabling the original respective route in the routing database of said DRA.

12. A method as claimed in claim 1 wherein said prespecified action comprises the step of removing the peer associated with original respective route from the routing database of said DRA.

13. A method as claimed in claim 1 wherein said prespecified action comprises the step of disabling the peer associated with original respective route from the routing database of said DRA.

14. A method as claimed in claim 1 wherein said prespecified action comprises the step of temporarily quarantining for a preset period of time the original respective route from the routing database of said DRA.

15. A method as claimed in claim 14 wherein said preset period of time is user configurable.

16. A method as claimed in claim 1 wherein said prespecified action comprises the step of temporarily quarantining for a preset period of time the peer associated with original respective route from the routing database of said DRA.

17. A method as claimed in claim 16 wherein said preset period of time is user configurable.

18. A method as claimed in claim 1 wherein said prespecified action comprises the step of lowering the priority of the original respective route from the routing database of said DRA.

19. A method as claimed in claim 1 wherein said prespecified action comprises the step of lowering the priority of routes through the peer associated with original respective route from the routing database of said DRA.

20. A method as claimed in claim 1 wherein said prespecified action comprises the step generating a log.

21. A method as claimed in claim 1 wherein said prespecified action comprises the step generating an SNMP trap.

22. A non-transitory machine readable storage medium encoded with instructions for execution by a DIAMETER Routing Agent (DRA) for processing a DIAMETER message associated with an original respective route, the medium comprising:

instructions for receiving a DIAMETER message associated with an original respective route at the DRA;
instructions for generating a statistic associated with the type of said DIAMETER message;
instructions for testing if said DIAMETER message is an unable_to_deliver message, and if said test is affirmative, then
  instructions for testing if said statistic exceeds a specified criterion, and if said test is affirmative, then
  instructions for taking a prespecified action.

* * * * *